United States Patent [19]

Sperry

[11] 3,987,980

[45] Oct. 26, 1976

[54] SIMPLIFIED PRECISION TAPE CASSETTE AND SYSTEM

[75] Inventor: John D. Sperry, Nevada City, Calif.

[73] Assignee: Arvin Industries, Inc., Columbus, Ind.

[22] Filed: Apr. 24, 1972

[21] Appl. No.: 246,635

[52] U.S. Cl. .............................. 242/199; 242/209; 360/96
[51] Int. Cl.² ......................................... G11B 23/10
[58] Field of Search ........... 242/199, 200, 197, 198, 242/194, 192, 71.2, 209, 71.1; 179/100.2 Z, 100.2 ZA; 274/4 B, 4 C, 11 B, 11 C

[56] References Cited
UNITED STATES PATENTS

| | | |
|---|---|---|
| 2,988,954 | 6/1961 | Kuhnert et al. .................. 242/198 X |
| 3,075,717 | 1/1963 | Kingston ............................. 242/200 |
| 3,528,625 | 9/1970 | Bumb, Jr. ............................ 242/192 |
| 3,656,705 | 4/1972 | Boyer.................................. 242/199 |

*Primary Examiner*—George F. Mautz
*Attorney, Agent, or Firm*—Biebel, French & Nauman

[57] ABSTRACT

A tape recording deck employs a capstan, transducer, and precision tape guide all mounted in fixed aligned position and immovable during use. The cassette has a minimum of parts, none of which need high precision manufacture, and can be inserted into and removed from the deck with a unidirectional motion.

2 Claims, 5 Drawing Figures

SIMPLIFIED PRECISION TAPE CASSETTE AND SYSTEM

CROSS REFERENCE TO RELATED APPLICATIONS

This application is related to copending application Ser. No. 246,812, filed Apr. 24, 1972, now U.S. Pat. No. 3,807,654 and assigned to the same assignee as this application.

BACKGROUND OF THE INVENTION

This invention relates to a magnetic tape deck and a corresponding cartridge system for use with the deck, for the purpose of magnetic recording and replay. The best known commercial magnetic tape handling systems employing a cassette or cartridge for the tape are the so-called Norelco cassettes, such as shown in U.S. Pat. No. 3,394,899, and the eight track cartridge system, such as shown in U.S. Pat. Nos. 3,478,973 and 3,482,792. In either of these systems the motive power to move the tape is supplied by a capstan cooperating with a pinch roll to nip the tape therebetween and move it forward past a magnetic transducer at a desired constant speed. The tape is then taken up on a takeup device which operates through a slip clutch, or in some other comparable fashion, to gather the tape in a roll after it passes the transducer and capstan.

In devices designed to operate with the cassette of the type shown in U.S. Pat. No. 3,394,899, it is customary to provide for a movement of the magnetic transducer toward and away from the cassette in order to bring the transducer into and out of contact with the tape. The capstan in those devices inserts through an aperture in the cassette behind the tape, and a pinch roll moves with the transducer, pushing the tape into engagement with the capstan as the transducer is brought forward to its operative position. Where more than one channel of operation is provided, and especially where the tape has different tracks when running in different directions it is necessary either to have a mounting of the transducer which is off center with respect to the longitudinal center of the tape, or else to provide for movement of the transducer transverse to the path of the tape through the face of the cassette.

In the so-called endless tape cartridge such as shown in U.S. Pat. No. 3,482,792, the pinch roller is incorporated as a part of the cassette or cartridge, and the entire cartridge is moved forward against the transducer and the pinch roll, with the transducer entering an opening in one end of the cassette, against the pinch roll. To follow different tracks on the tape, a transducer is provided with mechanisms which move it transversely of the tape to align with different tracks on the tape.

In either of these systems, the tape is passed within the cassette around various guide rollers, etc., and the tape is actually moved past the transducer by a capstan which is external of the cassette, held in contact with the tape by a pinch roller which either enters the cassette or is carried within it. The proper tracking guidance of the tape is provided by parts in the cassette, which is a volume production item, whereas the heads over which the tape must track accurately are supported on the deck. This introduces the need for accurate alignment of the cassette in the deck, especially for high quality, high density recording.

SUMMARY OF THE INVENTION

The present invention provides a magnetic tape cassette which is of simplified mechanical construction and arrangement, particularly for use with a deck which utilizes electrical and electronic controls to provide the necessary tape tension and constant feed. Separate drive motors are provided for the capstan, for the takeup roll, and for the supply roll. A capstan is mounted on the deck in such a way that the casssette can be moved partially around the capstan to guide the tape through a precision guide and over the face of a transducer mounted near the capstan, and to cause the tape to wrap around a portion of the capstan face, for example in the order of 60° to 90° of the cylindrical capstan surface.

As covered in the copending application, the speed of the capstan drive motor is sensed by a tachometer which in turn feeds a signal to an electronic servo control. The servo control provides a variable D.C. power output to the takeup motor and the supply motor, such that a predetermined tension is maintained in the tape to hold the tape properly in contact with the aforementioned segment of the capstan surface. This allows the capstan to maintain complete control over tape speed in the region of the transducer, without the need for a pinch roll or backup shoe, or some equivalent device. The capstan servo is simply a velocity servo with tachometer feedback. The capstan motor is preferably of the type which has a permanent magnet field, and is current driven, such that its output is independent of back E.M.F. and brush friction. The reel servo is separate from the capstan servo except in that its controlling signal is capstan current. The reel servo operates to control the supply and takeup motor currents in such a fashion as to require zero work of the capstan. The static tension level is established by setting appropriate quiescent currents to the supply and takeup motors.

Continuous traction between tape and capstan surface is guaranteed by the static tape tension and by the establishment of a zero work requirement at the capstan. Zero work, of course, implies balanced tape tension into and out of the capstan.

This arrangement allows the use of a simplified cassette and deck as provided by this invention, having only an optimum number of parts. The takeup and supply rolls constitute hubs mounted in the cassette body, together with the necessary passage space for the tape, and a pair of spaced guide rolls are provided near one face of the cassette. These form a tape path which extends past an opening in that face of the cassette, and which is arranged to receive the capstan, the transducer, and a small flanged guide roller which maintains precise alignment of the tape with the transducer for proper tracking of the tape over the transducer face. In a preferred embodiment the cassette is symmetrical in construction, and there are side openings on either side of its center to accommodate the capstan shaft, whereby the cassette can be inserted in either of two positions, in either case with the capstan, transducer, and flanged guide rollers extending partially into the front edge of the cassette and controlling tape motion and tracking.

Accordingly, the primary object of this invention is to provide a novel deck and cassette arrangement for the handling of magnetic recording tape and the like, in which the transducer, the drive capstan and an alignment guide device such as a flanged roller for aligning the tape in the cassette with the transducer are all mounted in fixed position on the deck; to provide such an arrangement wherein the supply and takeup drives can also be closely regulated to maintain predetermined tension in the tape guided around a portion of the capstan surface, thus eliminating the need for pinch rolls or other backup mechanism to keep the tape in contact with the capstan for the proper friction drive of the tape; and to provide a novel and relatively inexpensive cassette wherein the drive connections for the takeup and supply motors may readily be made to the hubs of the appropriate supply and takeup rolls within the cassette.

Other objects and advantages of the invention will be apparent from the following description, the accompanying drawings and the appended claims.

DESCRIPTION OF THE PREFERRED EMBODIMENT

Figure 1:
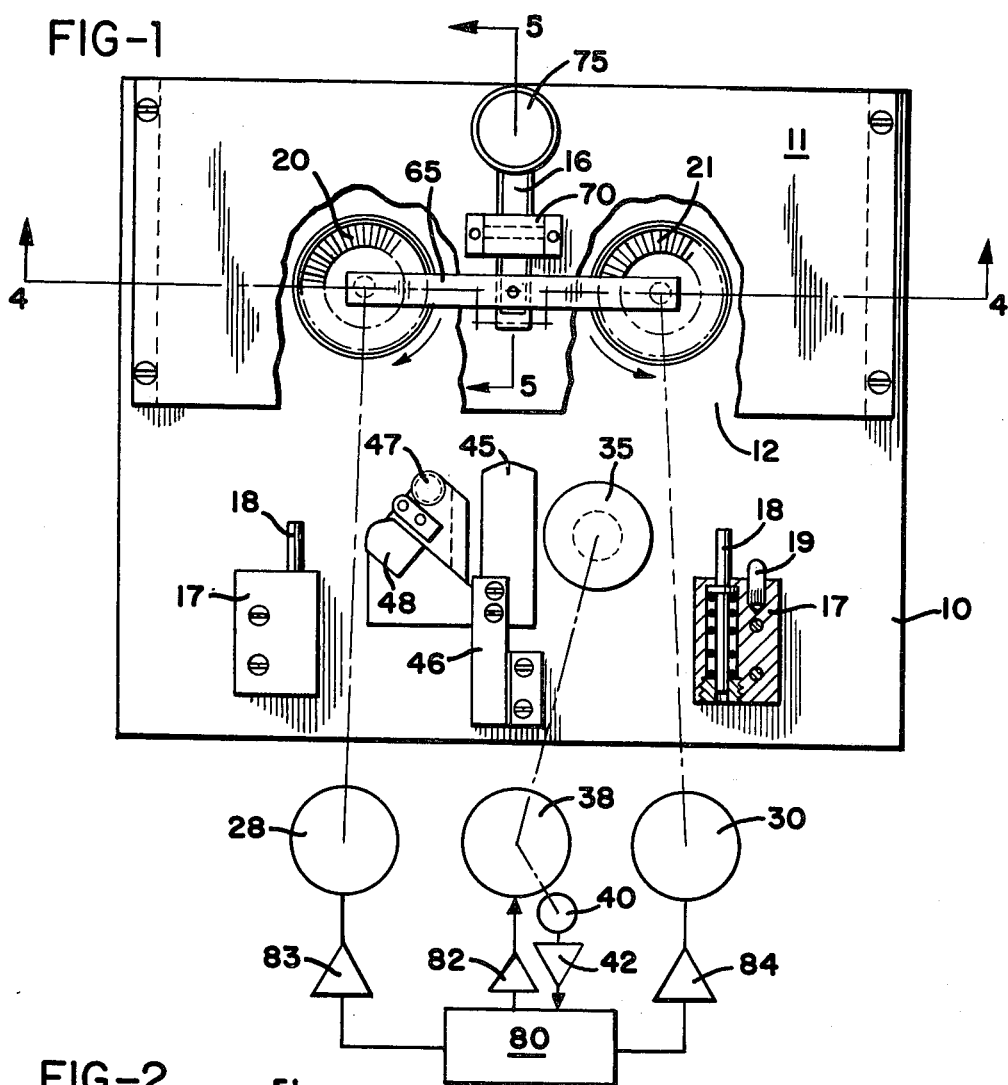
FIG. 1 is a plan view of the deck with some parts broken away, together with a schematic showing of the drive and control system.
Figure 2:
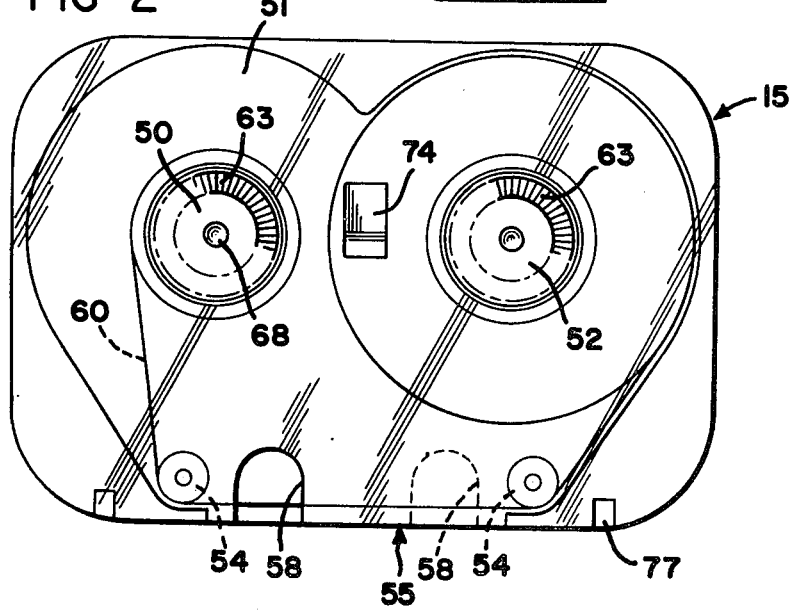
FIG. 2 is a plan view of the cassette.

Referring to FIG. 1, which shows the general arrangement of the deck, a base 10 is provided with walls 11 forming a generally rectangular cavity 12 of sufficient depth to receive the cassette 15, which is shown in FIG. 2. A spring loaded positioning arm 16 engages the cassette and holds it against stops 17 at the front edge of the cavity. The stops incorporate spring loaded ejector pins 18, and an alignment pin 19 in one of the stops. In the bottom of the cavity are the faces of toothed drive members which are indicated generally at 20 and 21. The members 20 and 21 (see also FIG. 4) comprise a disc with a plurality of radially oriented ridges or teeth 22 projecting upwardly and angularly from its surface. In one successful embodiment each tooth had one face extending upward from the disc at about 90°, and the other tooth face extending from the disc at about a 60° angle, with the vertical face intended to transmit driving torque. It is also possible to utilize undercut teeth as disclosed in U.S. Pat. No. 3,883,090. Disc 20 is fastened to a supply roll drive spindle 24, and similarly disc 21 is fastened to a takeup roll drive spindle 26.

As shown schematically in FIG. 1, these spindles extend to separate electric motors, namely the supply motor 28 and the takeup motor 30. These motors preferably are low voltage D.C. torque motors of the type having a permanent magnet field and a printed circuit form of rotor. The direction of rotation of each of these motors is such as to produce the desired rotation of the drive discs 20 and 21, respectively.

A cylindrical capstan 35 is mounted on a drive shaft 36 extending through base 10, and which in turn is driven by a motor 38 of the same general construction as the motors 28 and 30. Driven with the capstan is a tachometer 40 which provides a speed sensing means with an appropriate electrical output through amplifier 42. Adjacent to the capstan 35 is a magnetic transducer head 45 over which the tape is guided. Preferably this head is mounted in fixed position as shown, upon a bracket 46, which also carries a flanged alignment guide roller 47. The head 45 may include one or more magnetic transducer assemblies, depending upon whether the unit is to operate with one or more tracks on the tape. Also, a secondary transducer 48 may be mounted on bracket 46. The capstan, transducers 45 and 48, and guide 47 are all mounted precisely in fixed position on the base 10, and need not be moved except for alignment. Thus these parts do not ordinarily lose their precise alignment due to wear during use.

Figure 3:
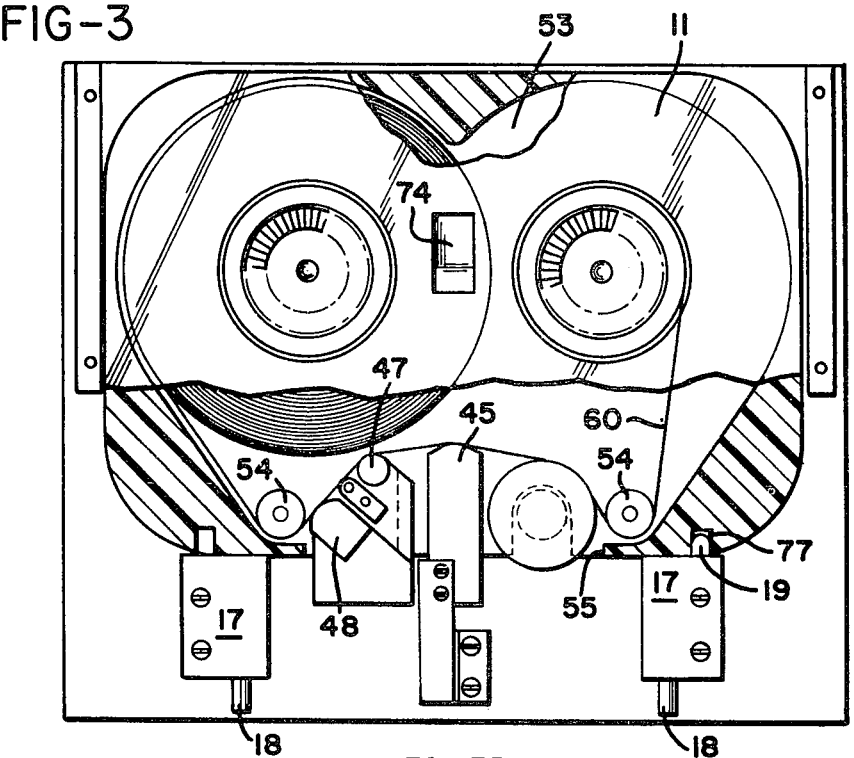
FIG. 3 is a segmental view of the deck with the cassette in operative position, illustrating the tape path across the transducers and around a portion of the capstan surface, with the cassette holding mechanism removed.

Referring to FIG. 2, the cassette housing 15 has transparent walls 51 and provides a mounting for a symmetrical arrangement of tape carrying and guiding equipment. For purposes of explanation the hub 50 is considered the supply hubs, and the hub 52 is considered the takeup hub, each of these being suitably rotatably mounted in the housing. At the front of the cavity 53 (FIG. 3) within the cassette housing are cylindrical guide rollers 54. In the front edge of the housing 15, between the rollers 53, there is an opening which is indicated generally by the reference numberal 55, and which opens into cavity 53 to receive the assemblage of the capstan 35, the transducer 45, and the alignment roller 47 within the front edge of the cassette. There are appropriate openings 58 in the top and bottom of the cassette housing in order to pass the capstan shaft 36. The remainder of the capstan, transducer and alignment roller preferably enter the front edge of the cassette housing through opening 55, generally as shown in FIG. 3, with either of its walls 51 upward.

The tape 60 is fastened at its opposite ends to the hubs 50 and 52. When the cassette is in place in the deck, the tape path is as shown in FIG. 3, with the tape in its normal feeding mode passing around rollers 54, between the flanges of the alignment roller 47, across the face of transducers 45 and 48, and through a partial loop around the surface of the capstan 35. It will be noted from FIG. 3 that there is a substantial surface-to-surface contact between the tape 60 and the capstan 35, over an arc of between 60° and 90°. This extended surface-to-surface contact between the tape and the capstan, together with the controls to be explained, provide for friction driving of the tape by the capstan, without the need of a backup plate, pinch rolls, or other such mechanism to pinch a segment of the tape against the capstan surface.

The top and bottom of the hubs 50 and 52 are provided with radially oriented ridges or teeth 63 (FIGS. 2 and 4) which correspond to teeth 22 of drive members or hubs 20 and 21, to provide a simple form of clutch. Should there be some force in the opposite direction, the hubs can overrun the teeth in the drive discs.

This clutch connection between the supply and takeup spindles and the corresponding supply and takeup hubs within the cassette provides a simple positive toothed drive without the need for interengaging shafts, keys, or the like. This arrangement also simplifies the manner in which the cassette can be placed and held within the cavity of the deck.

Figure 4:
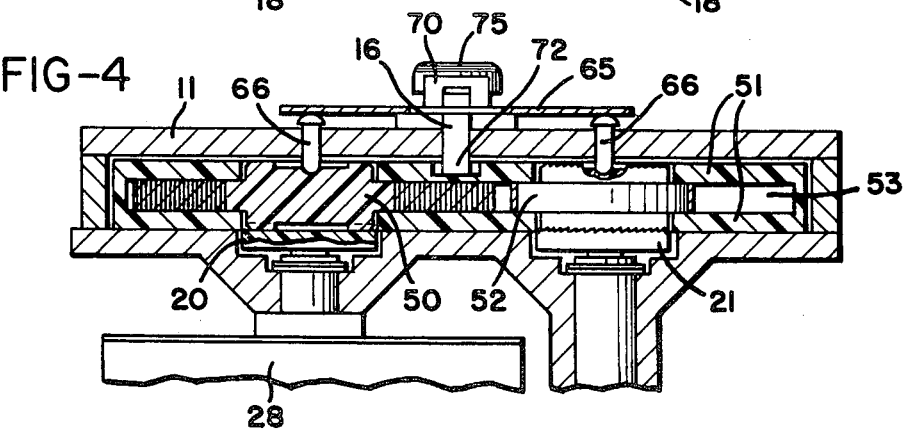
FIG. 4 is a cross-section view taken on line 4—4 in FIG. 1.
Figure 5:
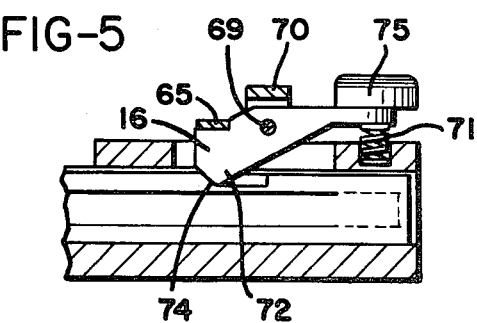
FIG. 5 is a partial cross-sectional view taken through the cassette retainer arm.

As shown in FIGS. 1, 4 and 5, the holddown arm 16 carries a leaf spring 65 which presses on pins 66 which are slidably mounted in the wall 11 to align with dimples 68 in the cassette hubs 50 and 52. Arm 16 is pivoted on a pin 69 carried in a short bracket 70 on top of wall 11. A spring 71 urges the cam end 72 of arm 16 into a retaining slot 74 in either wall 51 of the cassette, and a plate 75 provides a surface for tilting arm 16 against spring 71 to lift cam 72 out of the cassette slot. This also releases the pressure of leaf spring 65 on the pins 66 and hubs 50 and 52.

In operation the cassette is inserted into the cavity formed by walls 11, against the spring loaded pins 18, until the locator pin 19 engages a hole 77 in the cassette and lever 16 drops into slot 74. As this happens spring 65 presses the pins 66 into the hubs of the cassette, to insure engagement of the driven and driving teeth 63 and 22. When the lever 16 is manually moved, as by pressing plate 75, the pins 18 will eject the cassette partially from the cavity, to the point where it can be grasped and removed. Insertion and removal is with movement in one direction only, and without any movement of the precisely aligned capstan, tape guide, and transducers.

The drive control is illustrated schematically in FIG. 1. In general, it incorporates an electronic servo speed control 80 which provides an output to a control amplifier 82 driving the motor 38 for the capstan drive. Feedback from the tachometer through the amplifier 42 provides the necessary closed loop to maintain capstan speed at some predetermined constant. The servo system also senses the amount of current required to maintain capstan motor speed at the desired constant, and provides appropriate control signals to an amplifier 83 which controls the supply motor 28, and an amplifier 84 which controls the takeup motor 30. The arrangement is such that for any given power requirement of the capstan motor, there is a corresponding resistance power requirement for the supply motor 28, which opposes the supply of tape through the capstan, and there is a corresponding power requirement for the takeup motor 30 in order not only to take the tape away from the capstan, but also to maintain the tape loop in contact with the capstan surface. The balance between the action of these two motors maintains a predetermined tension in the tape, particularly in that region of the partial loop of tape in contact with the capstan, thus maintaining sufficient contact force to assure a constant frictional drive between the capstan and the tape without the use of pinch rollers or equivalent mechanisms. This drive system is applicable to other decks not employing a cassette for tape handling.

The system provided by the invention thus affords accurate control of tape tension and speed, for high quality recording and reproduction, using a simplified deck and cassette construction. The cassette is easily inserted and removed with a simple unidirectional motion. The cassette and the deck are easily manufactured, and the cassette in particular requires little precision construction although it gives precise operating results.

In a typical system successfully used, high quality recording was achieved on ten tracks (each direction) using a ¼ inch wide tape, with about 4,500 feet of 1 mil tape in a cassette, operating at 12 inches per second. Transducer 48 was employed as an erase head, transducer 45 was a ten unit or ten channel record/playback head, and member 86 functioned as a detector for the ends of the tape.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tape handling system comprising a deck including,
   a supply roll drive spindle,
   a takeup roll drive spindle,
   a capstan,
   a transducer,
   a tape guide adjacent said transducer for aligning moving tape with said transducer,
   a capstan drive connected to rotate said capstan to move tape past said transducer,
   means for rotating said takeup spindle in a direction to pull tape from said capstan and for rotating said supply spindle in a direction to withhold tape from said capstan,
   a base having said capstan, said spindles and said tape guide mounted thereon in fixed predetermined spaced relation;
   a hollow tape cassette,
   a supply roll in said cassette having a hub adapted for connection with said drive spindle,
   a takeup roll in said cassette having a hub adapted for connection with said takeup spindle,
   a length of tape fastened at its opposite ends to said hubs and wound about at least one of said hubs,
   said cassette having an opening in one edge for admitting at least a portion of said transducer and said capstan,
   means in said cassette guiding the tape from one hub to the other within said cassette across said opening,
   said opening being spaced sufficiently from the center of said rolls that the tape extending across said opening is moved back into said cassette without contacting the tape wound on said hubs,
   means on said deck forming a cavity to receive said cassette,
   and guide means locating said cassette in said cavity with said hubs aligned with said spindles and at least a portion of said capstan and said tape guide projecting into said cassette through said opening to form a partial loop of tape contacting a substantial section of the face of said capstan whereby there is a significant surface-to-surface tape driving contact between said capstan and said tape.

2. A tape handling system comprising a cassette with an opening in one edge and containing only a pair of hub members each having a driving connector accessible from the exterior of the cassette, a quantity of tape movable between said hub members, and guides on opposite ends of said opening guiding a length of the tape across said opening,
   a base,
   means on said base providing a cavity renovably receiving and positioning said cassette in a playing position,
   a transducer,
   a capstan,
   a precision tape guide,
   means mounting said capstan and said tape guide and said transducer in fixed closely spaced positions on said base at one end of said cavity to extend into said cassette opening with the cassette loaded into playing position engaging said length of tape and forming it into a loop of tape partially around said capstan and across said tape guide and said transducer, independently rotatable means located in a wall of said cavity and releasably engaged with said driving connectors for driving said rolls simultaneously in opposing directions with sufficient power to tension the tape against said tape guide and said transducer and partially around said capstan, and means for driving said capstan at a predetermined constant speed providing the power to drive the tape.

* * * * *